United States Patent Office 3,424,786
Patented Jan. 28, 1969

3,424,786
DERIVATIVES OF A NORPROGESTERONE
Seymour D. Levine, Princeton, and Patrick A. Diassi, Westfield, N.J., assignors, by mesne assignments, to E. R. Squibb & Sons, Inc., New York, N.Y., a corporation of Delaware
No Drawing. Original application Sept. 28, 1964, Ser. No. 399,838, now Patent No. 3,381,029, dated Apr. 30, 1968. Divided and this application Nov. 13, 1967, Ser. No. 708,736
U.S. Cl. 260—488     3 Claims
Int. Cl. C07c 171/06

ABSTRACT OF THE DISCLOSURE $\Delta^{3,6}$-A-norpregnadiene-2,20-dione-17-hydroxy and carboxylic acid ester derivatives thereof having progestational activity which can be used instead of progesterone, for example, in the treatment of habitual abortion.

This application is a division of our application Ser. No. 399,838, filed Sept. 28, 1964.

This invention relates to and has as its object the provision of new physiologically active steroids, methods for their production and novel intermediates useful in said preparation.

More particularly, this invention relates to the provision of steroids of the formulae

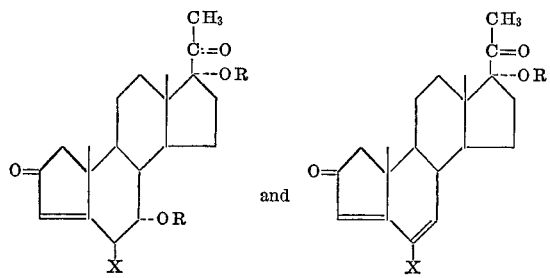

wherein X is halogen (e.g., chloro, bromo, fluoro) and R is selected from the group consisting of hydrogen and acyl.

The preferred acyl radicals are those of hydrocarbon carboxylic acids of less than twelve carbon atoms, as exemplified by the lower alkanoic acids (e.g., acetic, propionic butyric and tert-pentanoic acid), the lower alkenoic acids, the monocyclic aryl carboxylic acids (e.g., benzoic and toluic acids), the monocyclic aryl lower alkanoic acids (e.g., phenacetic and β-phenylpropionic acid), the cycloalkane carboxylic acids and the cycloalkene carboxylic acids.

The compounds of this invention possess progestational activity and thus may be employed instead of progesterone, for example, in the treatment of habitual abortion for which purpose they can be administered in the same manner as progesterone, for example, the dosage being adjusted for the relative potency of the particular steroid.

The final products of the instant invention may be prepared by the processes of this invention which entails a number of steps beginning with A-norprogesterone as starting material. The process of the instant invention may be represented by the following equations wherein R and X are as hereinbefore defined:

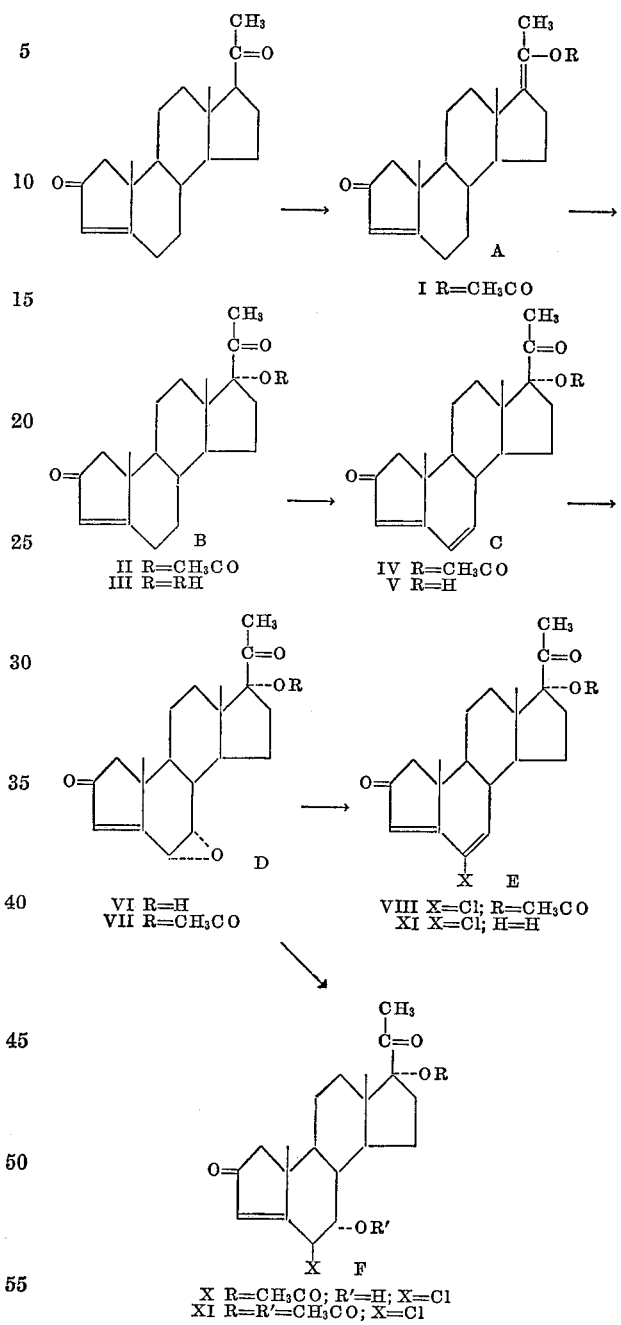

In the first step of the instant process, A-norprogesterone is enol acylated as by treatment with an acid anhydride, for example, acetic anhydride in the presence of a peracid, for example, perchloric acid, to yield the 17(20)-dehydro-20-acyloxy derivative (Compounds A), which are new compounds of the instant invention.

Compounds A are then treated with a peracid, for example, m-chloroperbenzoic acid, to yield the 17-substituted A-norprogesterone (Compounds B), which are also new compounds of this invention.

Compounds B are then dehydrogenated as by treatment with a dehydrogenating agent, for example, 2,3-dichloro-5,6-dicyanobenzoquinone to yield the $\Delta^{3,6}$-A-norpregnadiene derivatives (Compounds C) which are new compounds of this invention.

Compounds C are then treated with a peracid, such as m-chloroperbenzoic acid to yield the 6,7-oxido derivatives (Compounds D) which are also new compounds of the instant invention.

Treatment of Compounds D with 1 mole equivalent of a hydrohalic acid, for example, hydrochloric acid or hydrobromic acid yields the 6-halo-7-hydroxy-$\Delta^3$-A-norpregnene derivatives (Compounds F), which are also new compounds of the instant invention.

Alternatively, Compounds D may be treated with an excess of a hydrohalic acid, e.g., hydrobromic or hydrochloric acid at an elevated temperature, to yield the 6-chloro-$\Delta^{3,6}$-A-norpregnadiene derivatives (Compounds E), which are also new compounds of the instant invention.

The invention may be illustrated by the following examples:

EXAMPLE 1

$\Delta^{3,17(20)}$-A-norpregnadiene-2-one-20-ol acetate (I)

An ice-cold solution of 1.5 ml. of acetic anhydride containing three drops of perchloric acid is added to a solution of 250 mg. of A-norprogesterone in 8 ml. of carbon tetrachloride and 20 ml. of benzene and left at room temperature for one day. The reaction mixture is poured into ice-water and additional carbon tetrachloride is added. The organic layer is separated and washed with a saturated sodium bicarbonate solution and 8% salt solution, dried over sodium sulfate, and evaporated to dryness to give a 280 mg. residue. Plate chromatography of the residue using silica gel as the adsorbent and chloroform containing 1% of methanol as the developing solvent gives a major band at about Rf 0.4, which is detectable by ultraviolet. Elution with ethyl acetate and evaporation to dryness gives a 232 mg. residue. Crystallization of the residue from ether-hexane gives 21 mg. of $\Delta^{3,17(20)}$-A-norpregnadiene-2-one-20-ol acetate having a melting point of 131–132°. Recrystallization from isopropyl ether gives the analytical sample having melting point 131–132°; $[\alpha]_D^{29}$ —5° (EtOH):

$\lambda_{max.}^{KBr}$ 5.75, 5.92, 6.17$\mu$; $\lambda_{max.}^{EtOH}$ 234 m$\mu$ (19,400); $\tau^{Si(CH_3)_4}$ 9.11 (s., 18–Me); 8.83 (s., H19: Me); 8.21 (s., 21–Me); 7.90 (s., 20-acetate) and 4.27 (s., 3–H)

Analysis.—Calc'd for $C_{22}H_{30}O_3$ (342.46): C, 77.15; H, 8.83. Found: C, 77.20; H, 8.79.

EXAMPLE 2

$\Delta^3$-A-norpregnene-2,20-dione-17$\alpha$-ol (III)

A mixture of 150 mg. of m-chloroperbenzoic acid and 225 mg. of $\Delta^{3,17(20)}$-A-norpregnadiene-2-one-20-ol acetate in 4 ml. of chloroform is stirred at room temperature for two hours. The chloroform solution is washed five times with 5% sodium hydroxide solution, twice with 8% salt solution, dried over sodium sulfate and evaporated to dryness to give a gum. The gum is treated with a hot solution of 280 mg. of potassium hydroxide in 5 ml. of methanol and stirred at room temperature for thirty-five minutes and diluted with water. The precipitate is collected by filtration and washed with water and dried to give 100 mg. of $\Delta^3$-A-norpregnene-2,20-dione-17$\alpha$-ol having a melting point of 210–212°. The analytical sample is prepared by recrystallization from chloroform-ether, M.P. 233–234°, $[\alpha]_D^{26}$ +5° (EtOH):

$\lambda_{max.}^{KBr}$ 2.90, 5.87, 5.95, 6.17$\mu$; $\lambda_{max.}^{EtOH}$ 234 m$\mu$ (15,800); 300 m$\mu$ (143); $\tau^{Si(CH_3)_4}$ 9.24 (s., 18–Me), 8.82 (s., 19–Me), 7.72 (s., 21–Me); 7.15 (s., 17-hydroxy) and 4.25 (s., 3–H)

Analysis.—Calc'd for $C_{20}H_{28}O_3$ (316.42): C, 75.91; H, 8.92. Found: C, 76.09; H, 8.74.

EXAMPLE 3

$\Delta^3$-A-norpregnene-2,20-dione-17$\alpha$-ol acetate (II)

A mixture of 61 mg. of $\Delta^3$-A-norpregnene-2,20-dione-17$\alpha$-ol and 61 mg. of p-toluenesulfonic acid monohydrate in 0.6 ml. of acetic anhydride and 3 ml. of glacial acetic acid is left at room temperature for twenty-two hours, diluted with water and neutralized with potassium carbonate. The reaction mixture is extracted three times with ether, and the combined ether extracts are washed with 8% salt solution, dried over sodium sulfate and evaporated to dryness. Crystallization of the residue from isopropyl ether gives 50 mg. of $\Delta^3$-A-norpregnene-2,20-dione-17$\alpha$-ol acetate having a melting point of 182–184°. The analytical sample is prepared by recrystallization from isopropyl ether, M.P. 186.5–187.5°, $[\alpha]_D^{30}$ —47° (EtOH):

$\lambda_{max.}^{KBr}$ 5.78, 5.85, 5.94 (sh.), 6.17$\mu$; $\lambda_{max.}^{EtOH}$ 234 m$\mu$ (16,300); 292 (154); $\tau^{Si(CH_3)_4}$ 9.31 (s., 18–Me), 8.81 (s., 19–Me), 795 (s., 17-acetate), 7.90 (s., 21–Me) and 4.26 (s., 3–H)

Analysis.—Calc'd for $C_{22}H_{30}O_4$ (358.46): C, 73.71; H, 8.44. Found: C, 73.75; H, 8.34.

EXAMPLE 4

$\Delta^3$-A-norpregnene-2,20-dione-17$\alpha$-ol acetate (II)

A solution of 0.033 ml. of perchloric acid in 3 ml. of acetic anhydride is added to a stirred suspension of 4.79 g. of $\Delta^3$-A-norpregnene-2,20-dione-17$\alpha$-ol in 110 ml. of acetic anhydride. The reaction mixture is stirred at room temperature for thirty minutes and then poured into ice water and stirred until the oil which separates initially, solidifies. The precipitate is collected by filtration, and dried to give 4.76 g. of $\Delta^3$-A-norpregnene-2,20-dione-17$\alpha$-ol acetate, M.P. 186–187°.

EXAMPLE 5

$\Delta^{3,6}$-A-norpregnadiene-2,20-dione-17$\alpha$-ol acetate (IV)

Hydrogen chloride is bubbled into a solution of 1.40 g. of $\Delta^3$-A-norpregnene-2,20-dione-17$\alpha$-ol acetate and 1.0 g. of 2,3-dichloro-5,6-dicyanobenzoquinone in 30 ml. of dioxane for five minutes and the flask is left at room temperature overnight. The hydroquinone is filtered and the filtrate is evaporated to dryness. The residue is treated with chloroform and additional hydroquinone is filtered. The filtrate is diluted with additional chloroform to a total volume of 80 ml. and passed through a 40 g. neutral alumina (activity I) column. The column is eluted with 420 ml. of chloroform, and the eluate is evaporated to give a 1.42 g. residue, which is refluxed in 30 ml. of collidine for seventy-five minutes, cooled to room temperature and diluted with chloroform. The organic layer is washed with 2 N-hydrochloric solution, saturated sodium bicarbonate solution and 8% salt solution, dried over sodium sulfate and evaporated to dryness. Plate chromatography of the residue using neutral alumina (activity V) as the adsorbent and chloroform containing 10% hexane as the developing solvent gives a mjor band at about Rf 0.5, which is detectable by ultraviolet. Elution with ethyl acetate gives a residue which is crystallized from isopropyl ether to give 764 mg. of $\Delta^{3,6}$-A-norpregnadiene-2.20-dione-17$\alpha$-ol acetate having a melting point of 175–176°. The analytical sample is prepared by recrystallization from isopropyl ether, M.P. 178–179°, $[\alpha]_D^{26}$ —45° (EtOH):

$\lambda_{max.}^{KBr}$ 5.78, 5.87, 6.18 and 6.35$\mu$; $\lambda_{max.}^{EtOH}$ 277 m$\mu$ (16,300); $\tau^{Si(CH_3)_4}$ 9.31 (s., 18–Me), 8.88 (s., 19–Me), 7.94 (s., 17-acetcte), 7.92 (s., 21–Me), 4.25 (s., 3–H), 3.83 (d, d, ~1 ap.s., 9.5 c.p.s., 6–H), 3.46 (d, d, 2–3 c.p.s., 9.5, c.p.s. 7–H)

Analysis.—Calc'd for C$_{22}$H$_{28}$O$_4$ (356.44): C, 74.13; H, 7.92. Found: C, 74.09; H, 7.83.

EXAMPLE 6

Δ$^{3,6}$-A-norpregnadiene-2,20-dione-17α-ol (V)

A mixture of 500 mg. of Δ$^{3,6}$-A-norpregnadiene-2,20-dione-17α-ol acetate in 30 ml. of methanol is treated with 3 ml. of 10% potassium carbonate solution and stirred at room temperature for eighteen hours. The reaction mixture is diluted with water and the precipitate collected by filtration to give 303 mg. of Δ$^{3,6}$-A-norpregnadiene-2,20-dione-17α-ol having a melting point of 241–243°. The analytical sample is prepared by recrystallization from acetonitrile, M.P. 247–248°, [α]$_D^{32}$ +42° (EtOH);

λ$_{max.}^{KBr}$ 2.91, 5.87, 5.99, 6.20 and 6.35μ; λ$_{max.}^{EtOH}$ 278 mμ (22,600); τ$^{Si(CH_3)_4}$ 9.18 (s., 18–Me), 8.89 (s., 19–Me), 7.71 (s., 21–Me), 7.12 (s., 17-hydroxy), 4.26 (s., 3–H); 3.83 (d, d, 1 c.p.s., 9.5 c.p.s., 6–H), 3.48 (d, d, 2 c.p.s., 9.5 c.p.s., 7–H)

Analysis.—Calc'd for C$_{20}$H$_{26}$O$_3$ (314.41): C, 76.40; H, 8.34. Found: C, 76.23; H, 8.44.

EXAMPLE 7

6α,7α-oxido-Δ$^3$-A-norpregnene-2,20-dione-17α-ol acetate (VII)

A mixture of 320 mg. of Δ$^{3,6}$-A-norpregnadiene-2,20-dione-17α-ol acetate and 600 mg. of m-chloroperbenzoic acid in 40 ml. of methylene chloride is left at room temperature for sixty-six hours. The organic layer is washed with a saturated sodium bicarbonate solution, 5% sodium sulfite solution, and 8% salt solution, dried over sodium sulfate and evaporated to dryness. Crystallization of the residue from ether-chloroform gives 191 mg. of 6α,7α-oxido-Δ$^3$-A-norpregnene-2,20-dione-17α-ol acetate having a melting point of 202–204°. The analytical sample is prepared by recrystallization from acetone-hexane, M.P. 232–233°, [α]$_D^{30}$ —15$ (EtOH);

λ$_{max.}^{KBr}$ 5.78, 5.86, and 6.13μ; λ$_{max.}^{EtOH}$ 235 mμ (11,700); τ$^{Si(CH_3)_4}$ 9.28 (s., 18–Me), 8.88 (s., 19–Me), 7.94 (s., 17-acetate), 7.88 (s., 21–Me), 6.61 (d, d < 1 c.p.s., 3.5 c.p.s.; 7–H), 6.18 (d, 3.5 c.p.s., 6–H), 3.78 (s., 3–H)

Analysis.—Calc'd for C$_{22}$H$_{28}$O$_5$ (372.44): C, 70.94; H, 7.58. Found: C, 70.97; H, 7.57.

EXAMPLE 8

6α,7α-oxido-Δ$^3$-A-norpregnene-2,20-dione-17α-ol (VI)

Following the procedure of Example 6, but employing 6α,7α-oxido-Δ$^3$-A-norpregnene-2,20-dione-17α-ol acetate, there is obtained 6α,7α-oxido-Δ$^3$-A-norpregnene-2,20-dione-17α-ol.

EXAMPLE 9

6β-chloro-Δ$^3$-A-norpregnene-2,20-dione-7α,17α-diol 17-acetate (X)

A solution of 61.5 mg. of 6α,7α-oxido-Δ$^3$-A-norpregnene-2,20-dione-17α-ol acetate in 6 ml. of chloroform is treated with a slight excess of hydrogen chloride in chloroform and left at room temperature for two and one-half hours. The reaction mixture is diluted with water and the layers separated. The aqueous phase is extracted with additional chloroform. The chloroform extracts are washed with an 8% salt solution, dried over sodium sulfate and evaporated to dryness. Crystallization of the residue from ethyl acetate-isopropyl ether gives 50 mg. of 6β-chloro-Δ$^3$-A-norpregnene-2, 20-dione-7α,17α-diol 17-acetate having a melting point of 236–238°. The analytical sample is prepared by recrystallization from ethyl acetate-isopropyl ether, M.P. 246.5–247.5°, [α]$_D^{25}$ —76$ (EtOH);

λ$_{max.}^{KBr}$ 2.86, 5.85, and 6.16μ; λ$_{max.}^{EtOH}$ 235 (14,800); τ$^{Si(CH_3)_4}$ 9.25 (s., 18–Me), 8.58 (s., 19–Me), 7.94 (s., 17-acetate), 7.90 (s., 21–Me), 5.93 (m., 7–H), 5.20 (d, 2.5 c.p.s., 6–H), 3.92 (s., 3–H)

Analysis.—Calc'd for C$_{22}$H$_{29}$O$_5$Cl (408.91); C, 64.60; H, 7.15. Found: C, 64.57; H, 7.16.

EXAMPLE 10

6-chloro-Δ$^{3,6}$-A-norpregnadiene-2,20-dione-17α-ol acetate (VIII)

Hydrogen chloride is passed into a solution of 335 mg. of 6α,7α - oxido - Δ$^3$ - A-norpregnene-2,20-dione-17α-ol acetate in 30 ml. of chloroform for three minutes. The reaction mixture is left at room temperature for two hours, and then at 45° for one day. The reaction mixture is washed with water, saturated sodium bicarbonate solution and 8% salt solution, dried over sodium sulfate and evaporated to dryness. Plate chromatography of the residue using neutral alumina (activity V) as the adsorbent and chloroform containing 20% hexane as the developing solvent gives a major band at about R$f$ 0.8, which is detectable by ultraviolet. Elution with ethyl acetate gives a residue which is crystallized from isopropyl ether-ethyl acetate to give 177 mg. of 6β-chloro-Δ$^{3,6}$-A-norpregnadiene-2,20-dione-17α-ol acetate having a melting point of 183–184°. The analytical sample is prepared by recrystallization from isopropyl ether-ethyl acetate, M.P. 195.5–196.5°, [α]$_D^{28}$ —75° (EtOH);

λ$_{max.}^{KBr}$ 5.78 (sh.), 5.87, 6.18 and 6.33μ; λ$_{max.}^{EtOH}$ 280 mμ (19,700); τ$^{Si(CH_3)_4}$ 9.26 (s., 18–Me), 8.84 (s., 19–Me), 7.95 (s., 17-acetate), 7.91 (s., 21–Me), 3.95 (s., 3–H), 3.78 (d, 2 c.p.s., 7–H)

Analysis.—Calc'd for C$_{22}$H$_{27}$O$_4$Cl (390.89): C, 67.66; H. 6.96; Cl, 9.07. Found: C, 67.42; H, 7.00; Cl, 9.09.

EXAMPLE 11

6-chloro-Δ$^{3,6}$-A-norpregnadiene-2,20-dione-17α-ol

Following the procedure of Example 6, but employing 6-chloro-Δ$^{3,6}$-A-norpregnadiene-2,20-dione-17α-ol acetate, there is obtained 6-chloro-Δ$^{3,6}$-A-norpregnadiene-2,20-dione-17α-ol.

EXAMPLE 12

6β-chloro-Δ$^3$-A-norpregnene-2,20-dione-7α,17α-diol-diacetate

Following the procedure of Example 9, but substituting 6α-7α-oxido-Δ$^3$-A-norpregnene-2,20-dione-17α-ol, there is obtained 6β-chloro-Δ$^3$-A-norpregnene-2,20-dione-7α-17α-diol.

EXAMPLE 13

6-bromo-Δ$^{3,6}$-A-norpregnadiene-2,20-dione-17α-ol acetate

Following the procedure of Example 10, but substituting hydrogen bromide for hydrogen chloride, there is obtained 6-bromo-Δ$^{3,6}$-A-norpregnadiene-2,20-dione-17α-ol acetate.

The invention may be variously otherwise embodied within the scope of the appended claims.

What is claimed is:

1. A compound of the formula

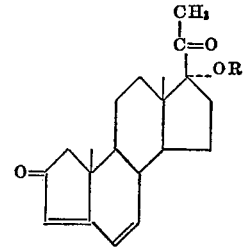

wherein R is selected from the group consisting of hydrogen and acyl derived from a hydrocarbon carboxylic acid having less than twelve carbon atoms.

2. $\Delta^{3,6}$-A-norpregnadiene-2,20-dione-17α-ol acetate.
3. $\Delta^{3,6}$-A-norpregnadiene-2,20-dione-17α-ol.

References Cited

UNITED STATES PATENTS 3,170,919  2/1965  Fried _____ 260—586
3,225,064  12/1965  Weisenborn _____ 260—586
3,338,957  8/1967  Weisenborn _____ 260—488

LORRAINE A. WEINBERGER, *Primary Examiner.*

VIVIAN GARNER, *Assistant Examiner.*

U.S. Cl. X.R.

260—586, 468, 476, 486, 410, 348, 348.5; 167—65